Sept. 20, 1955     H. P. CARRIER, JR     2,718,370

CARRIER

Filed June 7, 1952

INVENTOR.

Howard P. Carrier, Jr.

BY

United States Patent Office 2,718,370
Patented Sept. 20, 1955

2,718,370
CARRIER
Howard P. Carrier, Jr., Greenfield, Mass.
Application June 7, 1952, Serial No. 292,351
1 Claim. (Cl. 248—41)

My invention relates to improvements in a clamping device and is directed more particularly to the provision of a unique and novel construction for the clamping of a fish rod or similar device to a vehcile body in such a manner that the same is safely and securely supported.

It is the principal object of my invention to provide a device which comprises a simple but efficient clamp which is economical in its manufacture and simple in its operation.

It is a further object of my invention to provide a construction which is capable of attachment upon and removal from a vehicle or other object.

It is a still further object of my invention to provide a device which includes a pair of relatively movable arms which are yieldable as to each other whereby a fishing rod or similar article may be held therebetween.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Figure 1:
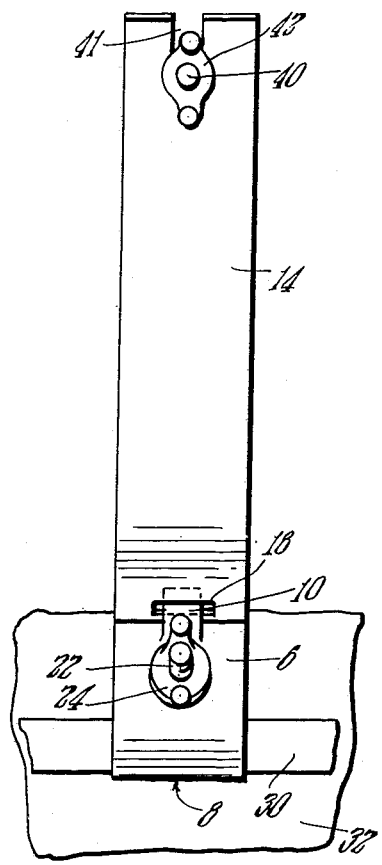
Fig. 1 is an end elevational view of the device of my invention.

Referring now to the drawing more in detail, and referring more particularly to the preferred form of my invention selected for illustrative purposes, I have shown an arm member 4 which has a lower end portion 6 which is offset and spaced inwardly of the plane of the upper portion and has a lowermost extremity which is turned inwardly to provide a lip 8.

The offset portion 6 is provided with a tongue 10 which is struck up therefrom.

Associated with the arm member 4 is another arm member 14 which has a lower extremity 16 which is offset and spaced inwardly of the plane of the upper portion. A slot 18 is provided in the offset portion 16. The tongue 10 is receivable through the slot 18 whereby the arm members 4 and 14 are held in hinged relation. By such hinged relation the arm members may be swung away from each other for purposes presently to be described.

A clamping plate 20 is provided which has upturned top and bottom portions 21 and 21 and which carries a threaded bolt 22 which is secured to the plate centrally thereof.

An opening is provided through the offset portion 6 of the arm member 4 through which the bolt 22 is receivable.

A wing nut 24 is in threaded engagement with the bolt 22.

As the nut is rotated in one direction, the arm member 4 and clamping plate 20 are moved toward each other while rotation in an opposite direction will release the close engagement therebetween.

Figure 2:
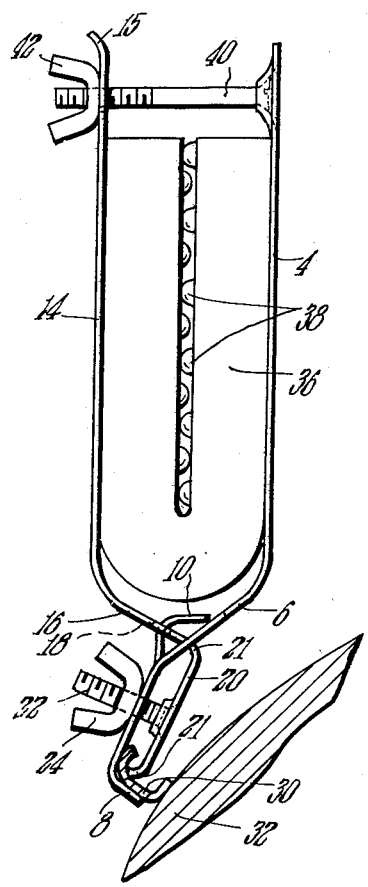
Fig. 2 is a side elevational view of the device shown in Fig. 1.

To explain the invention, a section of the top of an automobile 32 at the side thereof is shown in Figs. 1 and 2. A gutter 30 extends along the sides of the top as is well known. The gutter is usually semi-circular in its cross-section as illustrated in Fig. 2.

With this arrangement, the lip 8 may engage the underside of a gutter 30 of a vehicle 32 while the bottom upturned portion 21 of the plate 20 engages the upper side of the gutter.

It is to be appreciated that if the portion 6 of the member 4 and the plate 20 are urged toward each other, the gutter 30 is firmly gripped therebetween.

A cushion member 36 is preferably U-shaped and may be secured to the inner sides of the arms 4 and 14 as by adhesive or the like. This member 36 may be of rubber or other similarly yieldable material.

Buttons or ribs 38 are provided on the adjacent faces of the member 36 whereby the gripping action may be enhanced. If desired, in lieu of buttons or ribs 38, aligned indentations or grooves may be cut or otherwise formed in the adjacent faces so as to provide one or more openings through the member 36 from side to side.

It is to be appreciated that the arms 4 and 14 may be easily spread apart, same being hinged as to each other, so as to receive the fishing rod or rods or similar articles therebetween and when the arms are brought toward each other in parallelism (their normal operating positions) the cushion member yieldingly but firmly embraces same.

At the upper extremity of member 4 an opening is provided through which a bolt 40 is receivable.

The outer free end of the bolt 40 is receivable in a bifurcated slot 41 extending inwardly from the top of the member 14.

If desired, the bolt 40 may be covered with a yieldable material such as rubber tubing or the like to prevent any scratching of the objects being carried by the device.

A wing nut 42 is in threaded engagement with the bolt 40.

The upper extremity of the member 14 is flared outwardly as at 15 whereby when the nut 42 is threaded to the bolt 40 and the bolt is seated within the slot 41, the arm members 4 and 14 are held secure relative to each other, it being impossible for the bolt 40 to be slipped out of the slot 41 so long as the nut 42 is in engagement therewith.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A device for holding a fish rod adapted to be clamped to an elongated gutter trough curving transversely outwardly and upwardly from an automobile top comprising, an elongated inner member formed from an elongated strip of material to have an elongated upper vertical holding portion and a lower portion inclining outwardly and downwardly therefrom and terminating in a lower lip returning inwardly for engaging beneath said gutter trough, an elongated outer member formed from an elongated strip of material to have an elongated upper vertical holding portion and a lower portion inclining inwardly towards the lower portion of the inner member and terminating in an end abutting the lower portion of said inner member, the lower portion of said inner and outer members being loosely hingedly connected by a slot provided in the lower portion of said outer member receiving a loop formed by a tongue extending outwardly from the outer face of the lower portion of said inner member and then returning towards said face, an elongated plate adjacent the inner face of the lower portion of said inner member having lower and upper outwardly disposed extremities for abutting the inner side of said butter trough and said inner face respectively, a screw extending outwardly of said plate through an opening provided in the lower portion of said inner member and a nut on said screw outside said lower portion for drawing said plate towards said gutter trough, a screw extending outwardly from the upper end of said inner member through an opening provided in the corresponding end of said outer member, and a nut on said screw outside said outer member for drawing upper ends of said inner and outer members together.

References Cited in the file of this patent

UNITED STATES PATENTS

| | | |
|---|---|---|
| 95,086 | Colley | Sept. 21, 1869 |
| 694,888 | Pfluger | Mar. 4, 1902 |
| 1,393,158 | Pawsat | Oct. 11, 1921 |
| 2,080,261 | Funk | May 11, 1937 |
| 2,288,442 | Felton | June 30, 1942 |
| 2,529,285 | Felton | Nov. 7, 1950 |

FOREIGN PATENTS

| | | |
|---|---|---|
| 348,739 | Germany | Feb. 16, 1922 |